United States Patent
Weicker et al.

(10) Patent No.: US 10,811,740 B2
(45) Date of Patent: Oct. 20, 2020

(54) LIQUID COOLED BATTERY SYSTEM WITH INTEGRATED CURRENT CARRIER AND COOLANT PATH

(71) Applicant: Faraday & Future Inc., Gardena, CA (US)

(72) Inventors: Phillip John Weicker, Los Angeles, CA (US); Khiem Bao Dinh, Hawthorne, CA (US); David E. Featherstone, Los Angeles, CA (US)

(73) Assignee: Faraday & Future Inc., Gardena, CA (US)

( * ) Notice: Subject to any disclaimer, the term of this patent is extended or adjusted under 35 U.S.C. 154(b) by 0 days.

(21) Appl. No.: 16/013,192

(22) Filed: Jun. 20, 2018

(65) Prior Publication Data
US 2019/0393571 A1  Dec. 26, 2019

(51) Int. Cl.
| | | |
|---|---|---|
| *H01M 10/625* | (2014.01) | |
| *H01M 10/613* | (2014.01) | |
| *H01M 2/20* | (2006.01) | |
| *H01M 10/6568* | (2014.01) | |
| *B60L 58/26* | (2019.01) | |
| *B60K 1/04* | (2019.01) | |

(52) U.S. Cl.
CPC ........... *H01M 10/625* (2015.04); *B60L 58/26* (2019.02); *H01M 2/206* (2013.01); *H01M 10/613* (2015.04); *H01M 10/6568* (2015.04); *B60K 1/04* (2013.01); *B60K 2001/0438* (2013.01)

(58) Field of Classification Search
None
See application file for complete search history.

(56) References Cited

U.S. PATENT DOCUMENTS

| | | | |
|---|---|---|---|
| 9,853,435 B1* | 12/2017 | Burkman | H01M 2/1077 |
| 10,003,112 B1* | 6/2018 | Boor | B60L 58/26 |
| 2014/0255750 A1* | 9/2014 | Jan | H01M 2/206 |
| | | | 429/120 |
| 2016/0104873 A1* | 4/2016 | Smythe | H01M 2/202 |
| | | | 429/56 |
| 2016/0190663 A1* | 6/2016 | Bahrami | H01M 10/6553 |
| | | | 429/72 |
| 2017/0133928 A1* | 5/2017 | Hollung | H02J 1/10 |
| 2017/0358833 A1* | 12/2017 | Jalilevand | H01M 10/625 |
| 2018/0069279 A1* | 3/2018 | Tutzer | H01M 10/613 |
| 2018/0069281 A1* | 3/2018 | Tutzer | H01M 10/486 |
| 2018/0097265 A1* | 4/2018 | Tarlau | H01M 2/1077 |
| 2019/0074557 A1* | 3/2019 | Shin | H01M 10/625 |
| 2019/0318892 A1* | 10/2019 | Ikejiri | H01M 10/655 |

* cited by examiner

*Primary Examiner* — Scott J. Chmielecki
(74) *Attorney, Agent, or Firm* — Knobbe Martens Olson & Bear, LLP (57) ABSTRACT

Fluid cooled electric vehicle battery systems are disclosed. Systems can include an integrated coolant manifold and bus bar configured to carry coolant and electrical current along a common or coaxial path. An integrated coolant manifold and bus bar can include a conductive layer surrounding a coolant flow path and/or a conductor disposed within a coolant flow path. Integrated coolant manifold and bus bar structures may improve efficient use of battery space by reducing the number of battery components and by allowing reduced bus bar size due to fluid cooling of the bus bar.

15 Claims, 10 Drawing Sheets

LIQUID COOLED BATTERY SYSTEM WITH INTEGRATED CURRENT CARRIER AND COOLANT PATH

FIELD

This disclosure relates generally to energy-storage systems, and more specifically to liquid-cooled energy storage systems for vehicles.

BACKGROUND

Electric vehicles generally use one or more electric motors for propulsion and are powered by a battery system. Such vehicles include road and rail vehicles, surface and underwater vessels, electric aircraft, and electronic recreational devices. Electric vehicles release zero air pollutants and generate less noise than conventional combustion engine vehicles. Energy-storage systems are essential for electric vehicles. Size, efficiency, and safety are important considerations for these energy-storage systems. Spatially efficient storage and improved thermal management promote these goals.

SUMMARY

The systems and methods of this disclosure each have several innovative aspects, no single one of which is solely responsible for its desirable attributes. Without limiting the scope as expressed by the claims that follow, its more prominent features will now be discussed briefly.

In a first embodiment, an electric vehicle battery system comprises at least one battery module comprising one or more fluid cooled electrochemical cells and a terminal; a bus bar connected to the terminal, the bus bar configured to electrically connect the at least one terminal to an external terminal of the battery system; and a coolant manifold in fluid communication with the at least one battery module and a cooling system of the electric vehicle. At least a portion of the bus bar has a longitudinal axis disposed within the coolant manifold.

In some embodiments, at least a portion of the bus bar comprises a conductive layer surrounding a coolant flow path, the coolant flow path comprising at least a portion of the coolant manifold. In some embodiments, the bus bar further comprises an exterior covering surrounding the conductive layer, the exterior covering comprising an electrically insulating material. In some embodiments, at least a portion of the coolant manifold comprises an exterior wall surrounding both a coolant flow path and a conductor, the conductor comprising at least a portion of the bus bar. In some embodiments, the coolant manifold comprises an interior support structure configured to retain at least a portion of the bus bar therein. In some embodiments, the interior support structure and an exterior wall of the coolant manifold comprise an integrally formed extruded plastic profile. In some embodiments, at least a portion of the bus bar is coaxial with at least a portion of the coolant manifold. In some embodiments, the at least one battery module is in fluid communication with the coolant manifold through a coolant connection disposed along a portion of the coolant manifold disposed about the longitudinal axis of the bus bar. In some embodiments, the portion of the coolant manifold is disposed within the bus bar, and the coolant connection comprises an opening in the bus bar. In some embodiments, the terminal of the battery module is electrically connected to the bus bar by a connection disposed along the portion of the bus bar having the longitudinal axis disposed within the coolant manifold. In some embodiments, the portion of the bus bar is disposed within the coolant manifold, and the connection comprises a transverse electrical connector extending perpendicularly from the bus bar through the coolant manifold. In some embodiments, the electric vehicle battery system comprises a plurality of battery modules, each of the plurality of battery modules comprising a positive terminal and a negative terminal; a positive bus bar electrically connected to the positive terminals of the plurality of battery modules; a first coolant manifold coaxial with the positive bus bar along at least a portion of its length; a negative bus bar electrically connected to the negative terminals of the plurality of battery modules; and a second coolant manifold coaxial with the negative bus bar along at least a portion of its length. In some embodiments, each of the plurality of battery modules comprises an individually controllable battery string. In some embodiments, an electric vehicle comprises the electric vehicle battery system; an electric drivetrain electrically connected to the bus bar and configured to draw power from the one or more battery modules; and the cooling system configured to circulate a fluid dielectric through the at least one battery module along a flow path comprising the coolant manifold.

In a second embodiment, an integrated bus bar and coolant manifold comprises an exterior wall surrounding a coolant flow path along a longitudinal axis; a conductive bus bar disposed within a central portion of the coolant flow path, the bus bar extending along the longitudinal axis; and a support structure coupled to the exterior wall and at least partially surrounding the bus bar, the support structure configured to retain the bus bar in the central portion of the coolant flow path.

In some embodiments, the exterior wall and the support structure are integrally formed. In some embodiments, the exterior wall and the support structure comprise an extruded plastic profile. In some embodiments, the bus bar and the coolant flow path are coaxial. In some embodiments, the integrated bus bar and coolant manifold further comprises at least one peripheral electrical connection, the peripheral electrical connection comprising a transverse electrical connector extending from the bus bar along an axis perpendicular to the longitudinal axis, the transverse electrical connector configured to electrically connect bus bar and an electric vehicle battery module; and an electrical connector covering at least partially surrounding the transverse electrical connector within the coolant flow path. In some embodiments, the coolant flow path is in fluid communication with a cooling system configured to deliver a temperature-controlled flow of a coolant to the coolant flow path, and wherein the bus bar is electrically connected to a plurality of battery modules.

In a third embodiment, an integrated bus bar and coolant manifold comprises a bus bar comprising a conductive layer disposed about a longitudinal axis, the conductive layer defining a lumen therewithin along at least a portion of the bus bar; a coolant flow path coextensive with the lumen of the bus bar along at least a portion of the coolant flow path; and an insulating layer at least partially surrounding the bus bar.

In some embodiments, the bus bar and the coolant flow path are coaxial. In some embodiments, the integrated bus bar and coolant manifold further comprises at least one peripheral electrical connection, the peripheral electrical connection comprising an opening in the insulating layer and a transverse electrical connector extending from the bus bar through the opening. In some embodiments, the coolant flow path is in fluid communication with a cooling system configured to deliver a temperature-controlled flow of a coolant to the coolant flow path, and wherein the bus bar is electrically connected to a plurality of battery modules.

BRIEF DESCRIPTION OF THE DRAWINGS

The above-mentioned aspects, as well as other features, aspects, and advantages of the present technology will now be described in connection with various implementations, with reference to the accompanying drawings. The illustrated implementations are merely examples and are not intended to be limiting. Throughout the drawings, similar symbols typically identify similar components, unless context dictates otherwise.

DETAILED DESCRIPTION

Battery systems for high-power applications, such as electric vehicle drive systems, often use liquid cooling systems to remove heat from the battery cells during operation. In addition, such battery systems typically use bus bars to connect battery modules to the systems that will be powered. Bus bars may create additional heat that must be removed to prevent battery overheating. To reduce resistive heating in bus bars, the bus bars may be sized relatively large (e.g., may have a large cross-sectional area) to reduce the resistance of the bus bars and consequent resistive heat generation. However, in a size-constrained battery pack, bus bars and coolant manifolds require space that could otherwise be used for battery cells and/or battery cell containers, thus reducing the overall storage capacity of the battery pack.

The above-described challenges are addressed, in some embodiments, by the disclosed systems and methods of integrating bus bars and coolant manifolds into a combined carrier structure. The combined carrier structure may be, for example, an integrated bus bar and coolant manifold, integrated bus bar and coolant conduit, a current-carrying coolant manifold, and/or a coolant-carrying or liquid cooled bus bar. In some embodiments, the integration of a bus bar and coolant flow path may advantageously conserve space within a battery system (e.g., a battery pack, string, module, etc.), by eliminating the need for separate coolant and electrical flow paths. In another exemplary advantage, the integration of a bus bar and coolant flow path may provide for liquid cooling of the bus bar, which may allow the bus bar to be reduced in size (e.g., cross-sectional area), resulting in further space savings. In some embodiments, at least a portion of at least one bus bar of the battery system is coaxial with at least a portion of at least one coolant manifold of the battery system.

One or more batteries may use a fluid coolant or a liquid coolant to maintain appropriate operating temperatures. For example, one or more batteries may be enclosed by a housing and surrounded by liquid coolant. In some embodiments, coolant or cooling liquid or cooling fluid may include, for example, one or more of the following: synthetic oil, polyolefin (e.g., poly-alpha-olefin ("PAO")), ethylene glycol, ethylene glycol and water, and phase change materials ("PCM"). In some aspects, battery cooling systems employ liquid dielectrics as the coolant. In certain embodiments, a fluid coolant may be a gas or a phase change material configured to transition between liquid and gas states during operation. The coolant may be configured to transfer heat from the liquid coolant to the housing. The housing may include one or more heat sinks. In some embodiments, liquid may be circulated through the housing and/or through a heat exchanger.

The following description is directed to certain implementations for the purpose of describing the innovative aspects of this disclosure. However, a person having ordinary skill in the art will readily recognize that the teachings herein can be applied in a multitude of different ways. The described implementations may be implemented in any electrical circuit. In some implementations, the word "battery" or "batteries" will be used to describe certain elements of the embodiments described herein. It is noted that "battery" does not necessarily refer to only a single battery cell. Rather, any element described as a "battery" or illustrated in the Figures as a single battery cell in a circuit may equally be made up of any larger number of individual battery cells and/or other elements, or may be a single module within a larger battery structure, without departing from the spirit or scope of the disclosed systems and methods.

Figure 1:
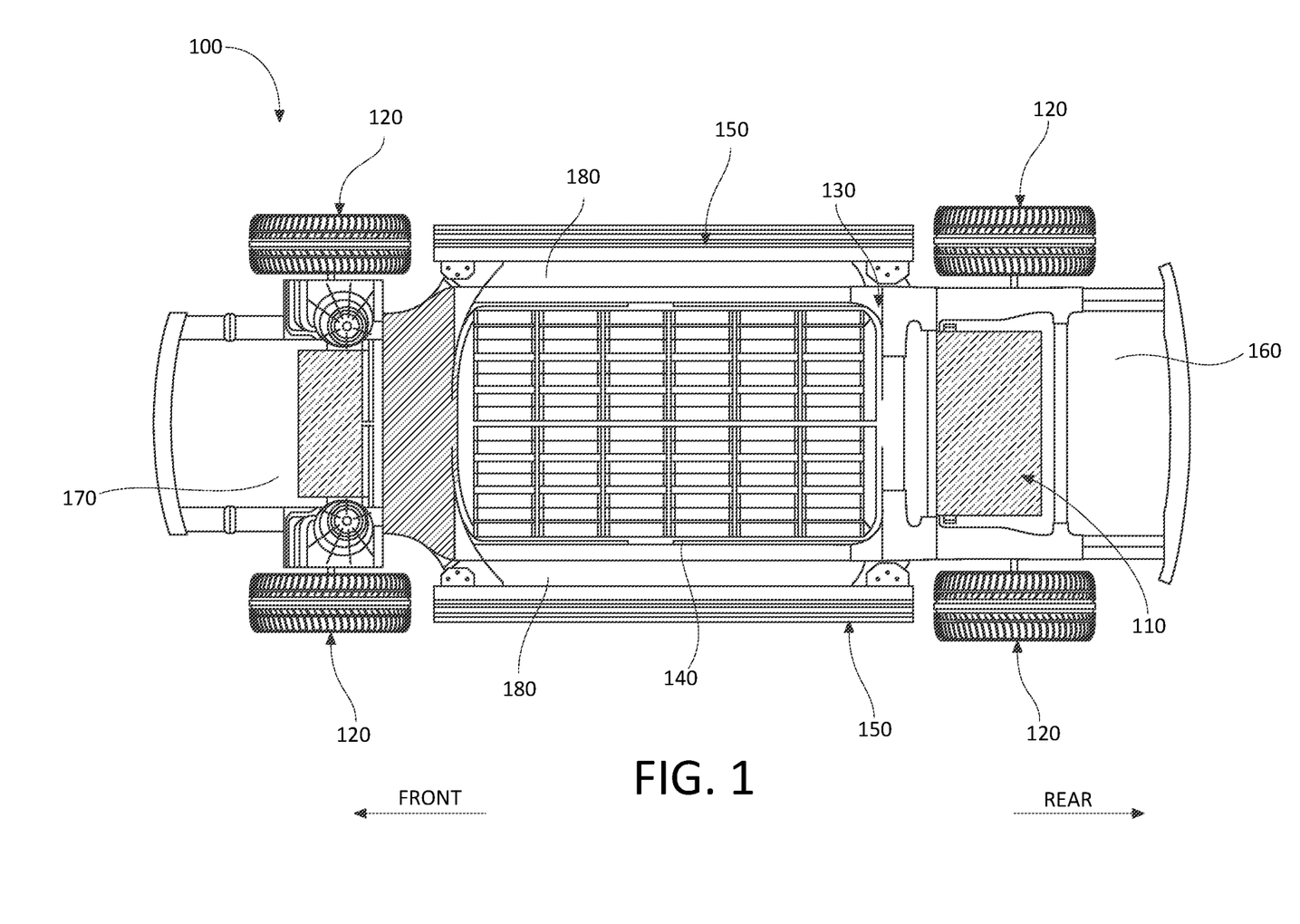
FIG. 1 depicts an example electric vehicle having an example battery pack.

FIG. 1 depicts an example electric vehicle 100. The electric vehicle 100 may be propelled by one or more electric motors 110. The electric motor 110 may be coupled to one or more wheels 120 through a drivetrain (not shown in FIG. 1). The electric vehicle 100 may include a frame 130 (also known as an underbody or chassis). The frame 130 may be a supporting structure of the electric vehicle 100 to which other components may be attached or mounted, such as, for example, a battery pack 140.

The electric vehicle 100 may further include structural rails 150, a rear crumple zone 160, a front crumple zone 170, and lateral crumple zones 180. The battery pack 140 may have a compact "footprint" and be disposed such that it may be at least partially enclosed by the frame 130. The battery pack 140 may be positioned at a predefined distance from the structural rails 150. In some embodiments, the battery pack 140 may be positioned such that the frame 130, structural rails 150, rear crumple zone 160, front crumple zone 170, and lateral crumple zone 180 protect the battery pack 140 from forces or impacts exerted from outside of the electric vehicle 100, for example, in a collision. In some embodiments, the battery pack 140 may be disposed within the frame 130 to help improve directional stability (e.g., yaw acceleration). For example, the battery pack 140 may be disposed within the frame 130 such that a center of gravity of the electric vehicle 100 may be in front of the center of the wheelbase (e.g., it may be bounded by a plurality of wheels 120).

Figure 2A:
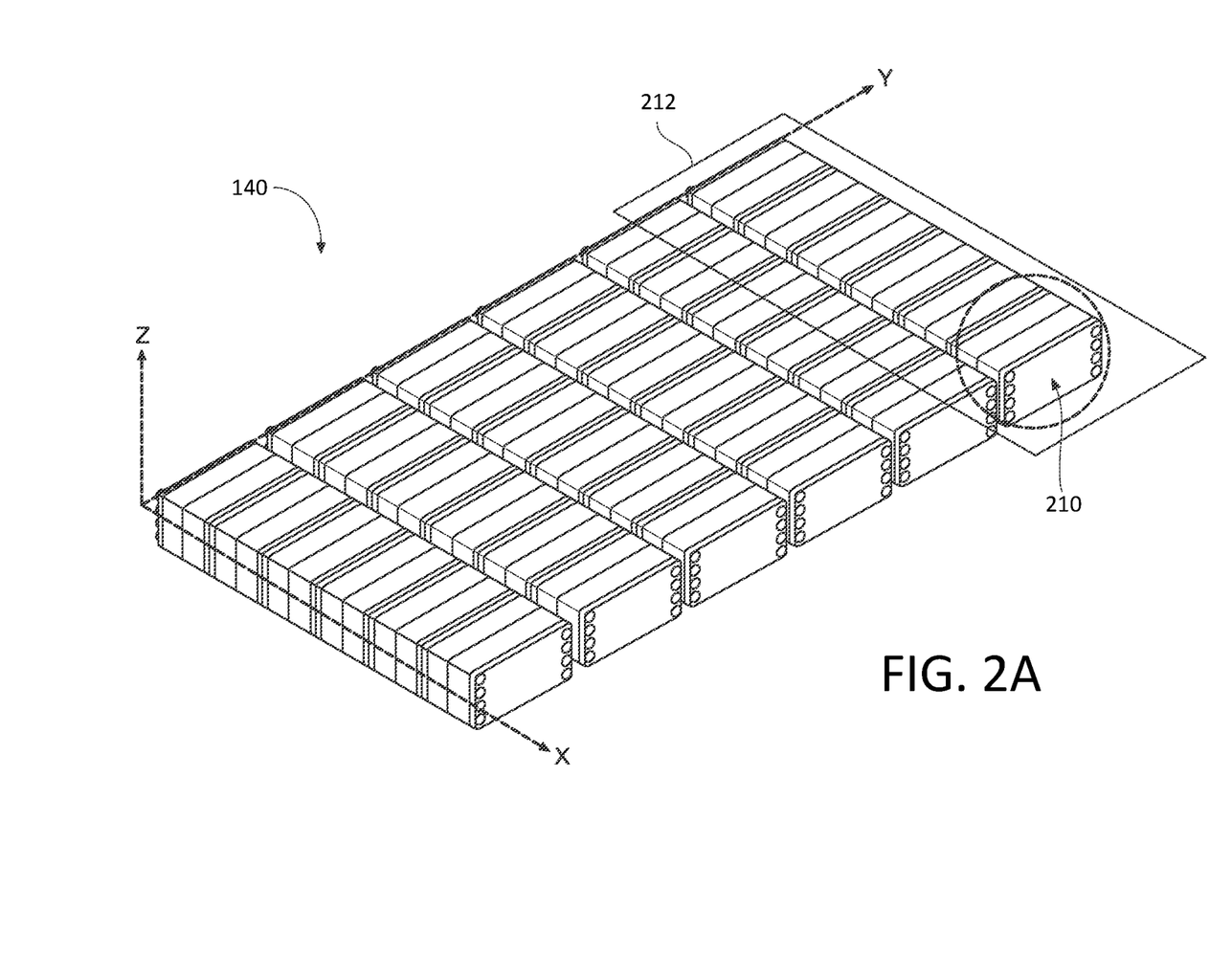
FIG. 2A depicts the example battery pack of the electric vehicle of FIG. 1 when removed from the electric vehicle.

FIG. 2A depicts the battery pack 140 of FIG. 1. Imaginary x-, y-, and z-axes are depicted on the battery pack 140. The battery pack 140 may be of any size and dimensions. For example, the battery pack 140 may be approximately 1000 mm wide (along x-axis), approximately 1800 mm long (along y-axis), and approximately 150 mm high (along z-axis). However, other sizes are possible. Generally, the battery pack 140 may be sized and shaped to fit within a corresponding battery compartment of the electric vehicle 100. Thus, the dimensions and overall size of the battery pack 140 may be constrained by one or more interior dimensions of the battery compartment.

In some embodiments, the battery pack 140 may be modular and/or subdivided into smaller functional units. For example, the battery pack 140 may include a plurality of battery modules 210. In one example, the battery pack 140 may include thirty-six battery modules 210. At least some of battery modules 210 may be electrically connected in a series forming a string 212, and two or more strings 212 may be electrically connected in parallel. In various embodiments, modular battery configurations may be advantageous, for example, by allowing the battery pack 140 to continue operating despite the failure or malfunction of one or more strings 212, such as by disconnecting the malfunctioning strings 212. In this example configuration, if one of strings 212 fails, others of strings 212 may not be affected.

Figure 2B:
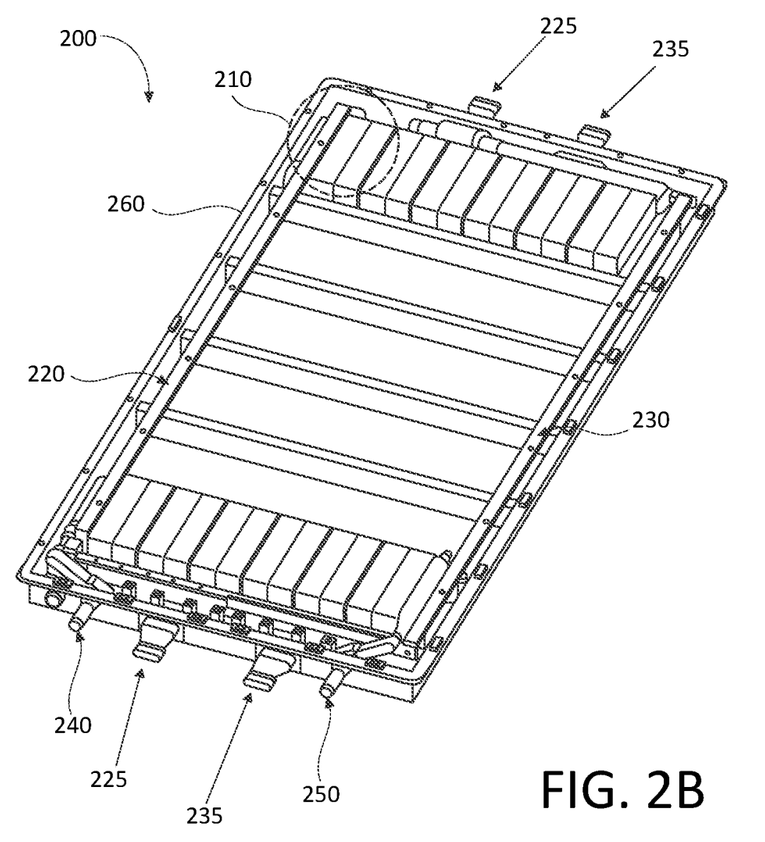
FIG. 2B depicts the example battery pack of FIG. 5A disposed in an example enclosure.

FIG. 2B depicts the battery pack 140 of FIG. 1 in an example enclosure 200. The enclosure 200 may include a tray 260. Enclosure 200 may further include a cover (not illustrated). The tray 260 may include a positive bus bar 220 and a negative bus bar 230. The negative bus bar 230 and the positive bus bar 220 may be disposed along opposite edges of the tray 260, or may be disposed to have a predefined separation between the negative bus bar 230 and the positive bus bar 220.

The positive bus bar 220 may be electrically coupled to a positive portion of a power connector of each battery module 210. Similarly, the negative bus bar 230 may be electrically coupled to a negative portion of a power connector of each battery module 210. The positive bus bar 220 may be electrically coupled to positive terminals 225 of the enclosure 200. The negative bus bar 230 may be electrically coupled to negative terminals 235 of the enclosure 200. When used in the electric vehicle 100, bus bars 220 and 230 may be disposed within structural rails 150.

The battery pack 140 may be fluid cooled, such as by a liquid, a gas, and/or a phase changing material that may change between liquid and gas states during operation. Fluid cooling may be desirable for various battery pack configurations by providing efficient heat transfer in relatively compact battery configurations, so as to provide reliable temperature regulation and maintain battery cells within a desired range of operating temperatures. In liquid cooled embodiments, coolant may enter the battery pack 140 at a coolant ingress 240 and may leave at a coolant egress 250. Coolant may be distributed within the battery pack 140 by one or more conduits, manifolds, tubes, or other coolant-carrying structures configured to surround a coolant flow path.

Figure 3:
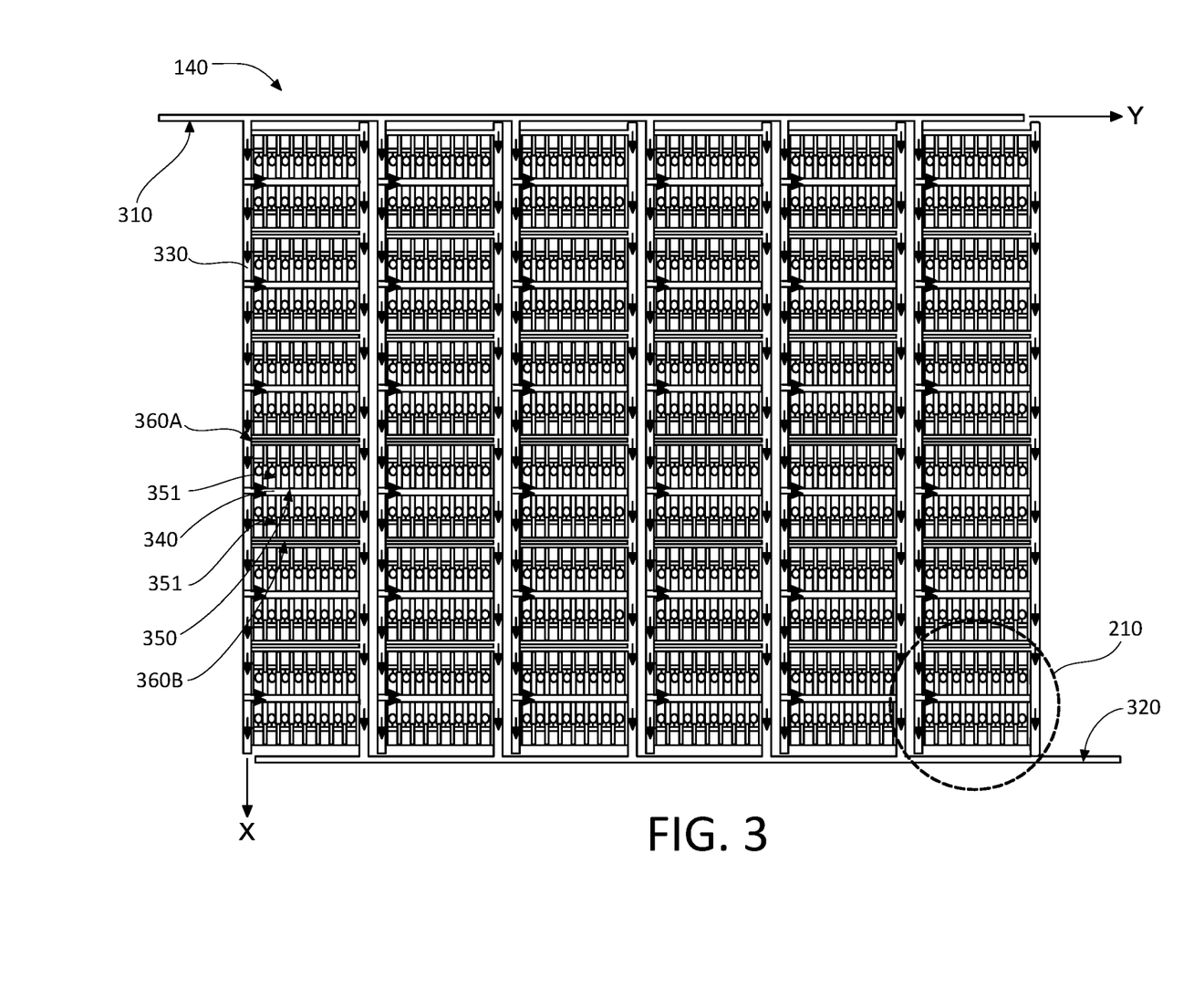
FIG. 3 is a schematic illustration of exemplary coolant flow paths in the exemplary battery pack of FIGS. 1-2B.

FIG. 3 illustrates example coolant flows and the exemplary operation of an example coolant system that may be used in conjunction with battery pack 140. An example coolant system may include an ingress 310 and an egress 320. For example, coolant may be pumped into battery pack 140 at ingress 310 and pumped out of battery pack 140 at egress 320. For example, coolant may be routed in parallel to each of battery modules 210 in battery pack 140. The resulting pressure gradient within battery pack 140 may provide sufficient circulation of coolant to minimize a temperature gradient within battery pack 140 (e.g., a temperature gradient within one of battery modules 210, a temperature gradient between battery modules 210, and/or a temperature gradient between two or more of strings 212 shown in FIG. 5A).

Within battery pack 140, the coolant system may circulate the coolant, for example, to battery modules 210 and/or to a cooling plate configured to externally cool one or more battery modules 210 (e.g., along the coolant flow path indicated by reference numeral 330). Coolant may include at least one of the following: synthetic oil, for example, poly-alpha-olefin (or poly-α-olefin, also abbreviated as PAO) oil, ethylene glycol and water, liquid dielectric cooling based on phase change, and the like. One or more additional pumps (not shown) may be used to maintain a roughly constant pressure between multiple battery modules 210 connected in series (e.g., in string 212 in FIG. 2A) and between such strings.

The coolant sub-system may circulate coolant within battery modules 210 (e.g., the coolant flow path indicated by reference numeral 340). In some embodiments, the coolant may enter each battery module 210 through a channel 350. The coolant may flow through battery module 210. Channel 350 may be oriented to channel coolant into battery module 210 along the y-axis. Coolant may then be driven by pressure within the coolant system to flow out of battery module 210 through one or more channels 351 oriented along the x-axis. Coolant may then be collected at the two (opposite) side surfaces 360A and 360B of the module. Side surfaces 360A and 360B may be normal to the x-axis. In some embodiments, the coolant and sub-coolant systems may be used to maintain a substantially uniform and/or constant temperature within battery pack 140.

Figure 4A:
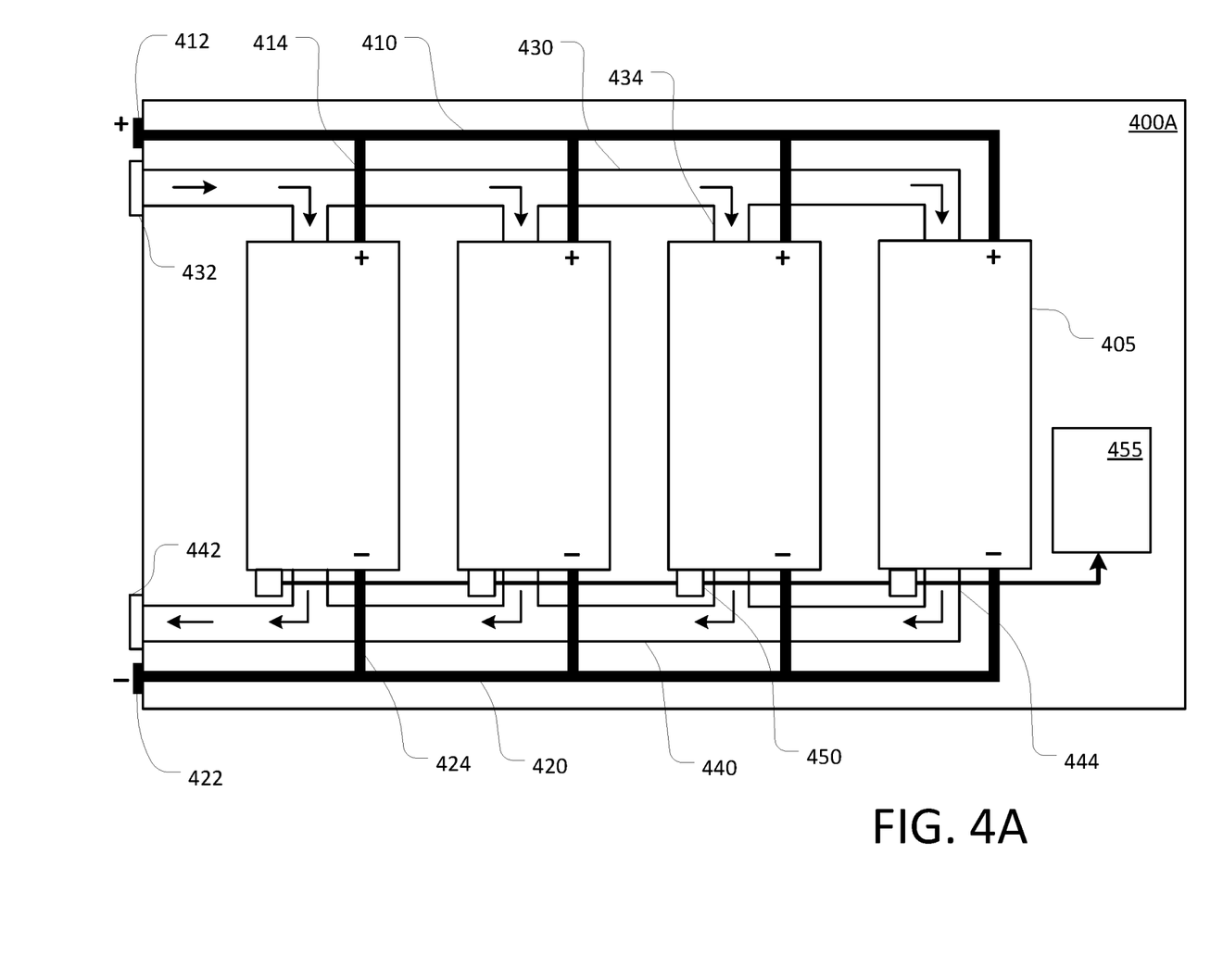
FIG. 4A depicts an example configuration of a liquid cooled battery system including electrical connections and a coolant manifold.
Figure 4B:
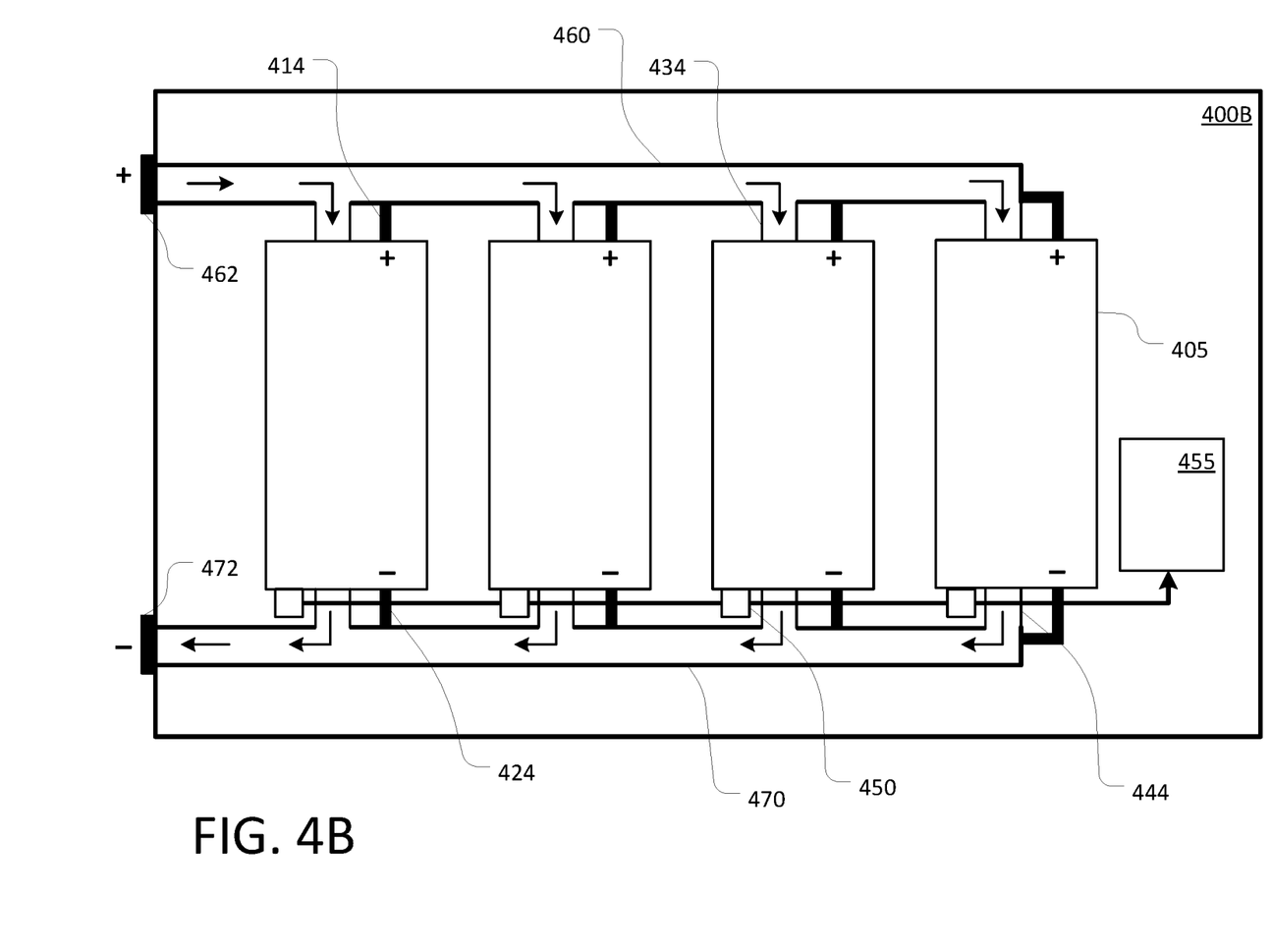
FIGS. 4B and 4C depict example configurations of a liquid cooled battery system including an integrated bus bar and coolant manifold.
Figure 4C:
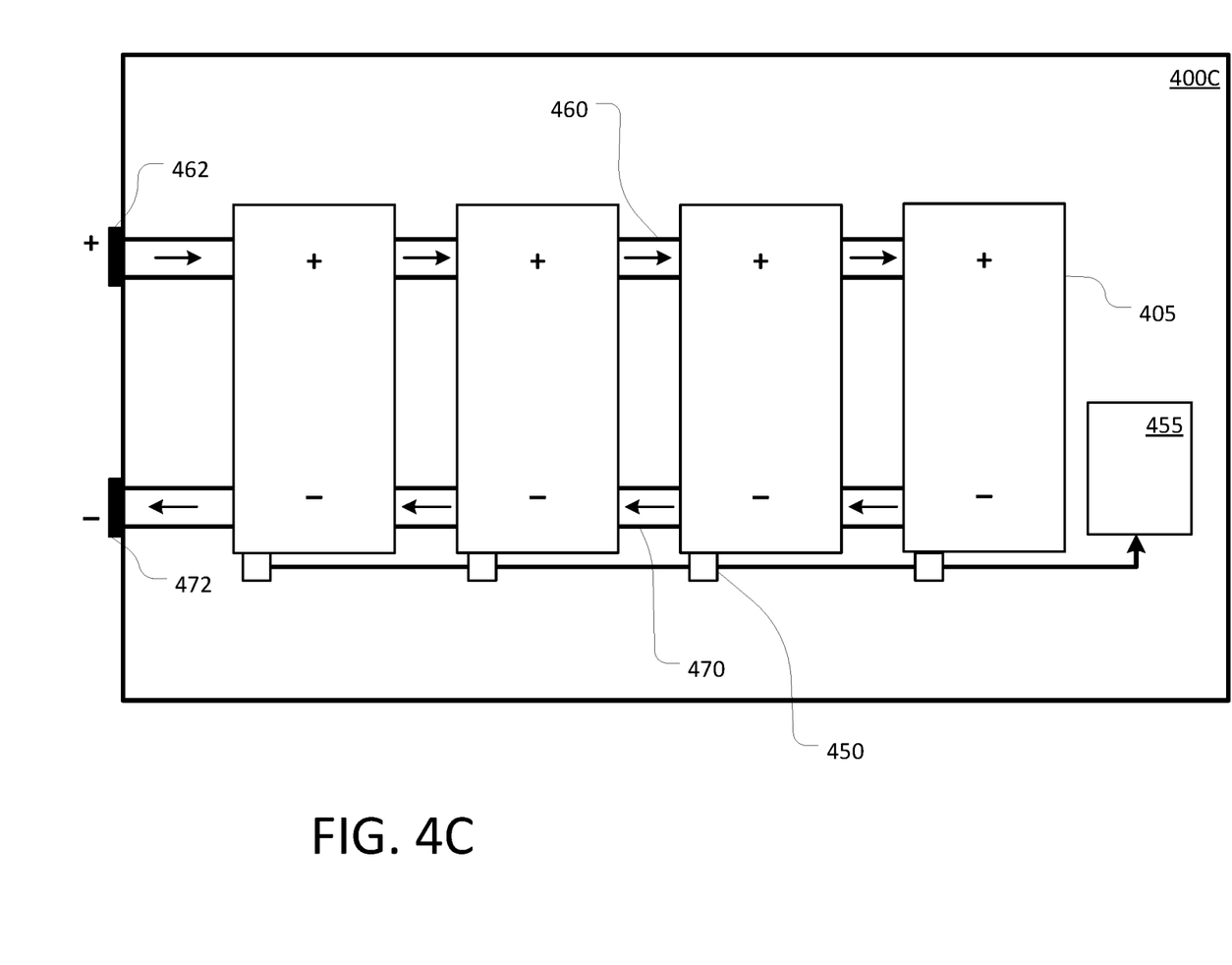

FIGS. 4A-4C schematically depict components of a respective example battery pack 400A, 400B, and 400C. Each of the battery packs 400A, 400B, 400C may be, for example, a battery pack similar to the battery pack 140 of FIGS. 1-3, and/or may be a component thereof, such as a string 212 or a module 210 (FIG. 2A). As shown in FIG. 4A, the battery pack 400A includes a plurality of liquid cooled battery modules 405 or other battery subgroups. Together, some or all of the battery modules 405 may form a string similar to that described with respect to FIG. 2A. Each battery module 405 can include a sealed enclosure including one or more electrochemical cells. The individual battery modules 405 may be controlled by individual module control units 450. The battery pack 400A may be controlled by a pack control unit 455 electrically connected to the string control units 450.

To provide electrical connections between the battery modules 405 and vehicle systems external to the battery pack 400A, the battery pack 400A includes a positive bus bar 410 electrically connected to a positive terminal 412, and a negative bus bar 420 electrically connected to a negative terminal 422. Each battery module 405 is connected to the positive bus bar 410 by a positive electrical connector 414. Each battery module 405 is connected to the negative bus bar 420 by a negative electrical connector 424.

To provide liquid coolant to the battery modules 405, the battery pack 400A includes a coolant supply manifold 430 in fluid communication with a coolant ingress 432, and a coolant return manifold 440 in fluid communication with a coolant egress 442. The interior of each battery module 405 is in fluid communication with the coolant supply manifold 430 through a coolant supply conduit 434. The interior of each battery module 405 is in fluid communication with the coolant return manifold 440 through a coolant return conduit 444.

As shown by the configuration of the battery pack 400A, as well as the battery pack 140 as depicted in FIGS. 1 and 2B, space within the battery pack 400A may be limited by external constraints such as the size of a battery compartment. To improve and/or optimize the amount of energy storage possible for a predetermined battery pack size, efficient use of space within the battery pack 400A is desirable. Existing configurations of liquid cooled batteries typically require current-carrying bus bars 410, 420 to be separate and insulated from other components, such as the coolant manifolds 430, 440. Moreover, the bus bars 410, 420 typically are not cooled, which can require relatively large bus bars to avoid excessive resistive heating. Thus, the bus bars 410, 420 and coolant manifolds 430, 440 may occupy a substantial amount of space that could otherwise be use for additional energy storage.

Referring now to FIGS. 4B and 4C, the space within a battery pack 400B, 400C may be more efficiently used by combining the current carrier and coolant flow path in a compact and/or coaxial configuration. The examples presented herein refer to the current carrier and coolant flow path as coaxial, that is, having a common axis. However, in some embodiments the current carrier and coolant flow path may be offset so that they are not truly coaxial, but such that one of the current carrier and coolant flow path is still contained within the other of the current carrier and coolant flow path. For example, in the various configurations described below, the longitudinal axis of the current carrier (e.g., an axis running along the center of the current carrier) is disposed within the coolant flow path along at least a portion of the longitudinal axis.

As will be described in greater detail, at least a portion of the positive and/or negative bus bar may be coaxial with at least a portion of one of the coolant manifolds. The battery packs 400B, 400C include an integrated positive bus bar and coolant supply manifold 460, and an integrated negative bus bar and coolant return manifold 470. It will be appreciated that the coolant supply manifold can instead be integrated with the negative bus bar in other embodiments, and the coolant return manifold can be integrated with the positive bus bar. In the example configuration of FIG. 4B, the integrated bus bar and coolant manifolds 460, 470 each comprise a single carrier extending along the length of the battery pack 400B. Similar to the embodiment depicted in FIG. 4A, connections to the individual battery modules 405 are made by electrical connectors 414, 424 and coolant conduits 434, 444. In the example configuration of FIG. 4C, the integrated bus bar and coolant manifolds 460, 470 comprise a plurality of discrete segments connecting adjacent battery modules 405. As will be described in greater detail with reference to FIGS. 5A-7, the integrated bus bar and coolant manifolds 460, 470 can include flow paths for both electrical current and liquid coolant. Although battery packs 400B, 400C integrate the positive bus bar with the coolant supply manifold, and the negative bus bar with the coolant return manifold, it will be appreciated that other implementations may instead integrate the positive bus bar with the coolant return manifold, and the negative bus bar with the coolant supply manifold.

Figure 5A:
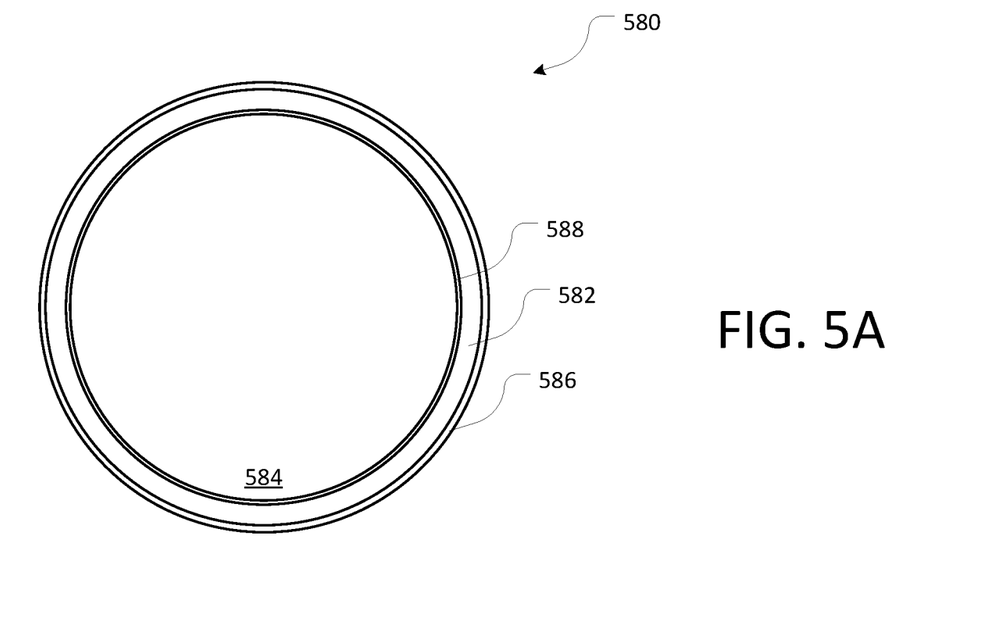
FIGS. 5A and 5B are cross-sectional views of an example configuration of an integrated bus bar and coolant conduit.
Figure 5B:
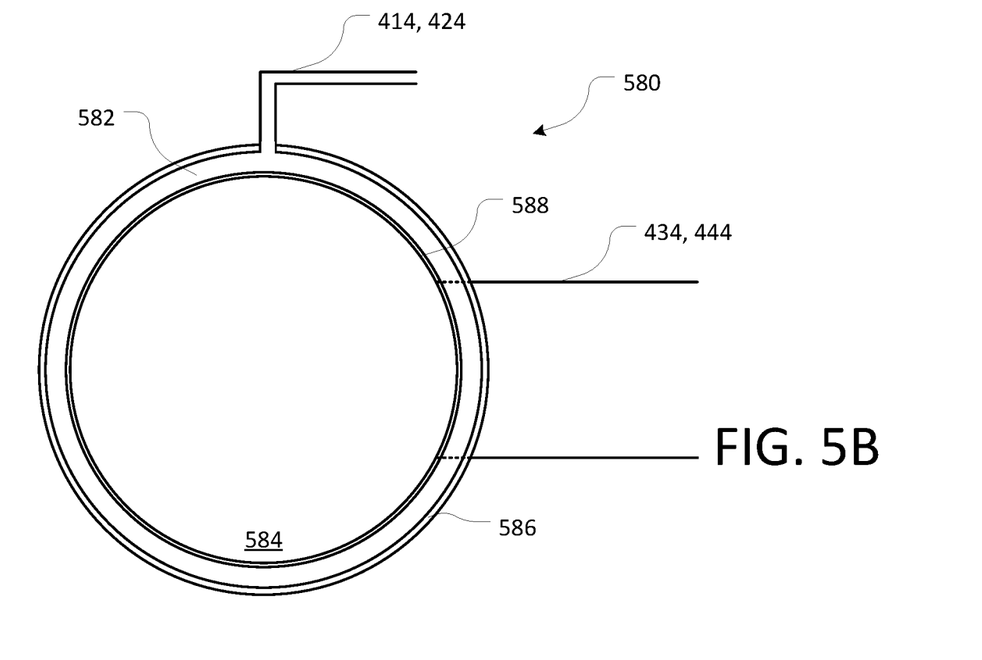
Figure 6A:
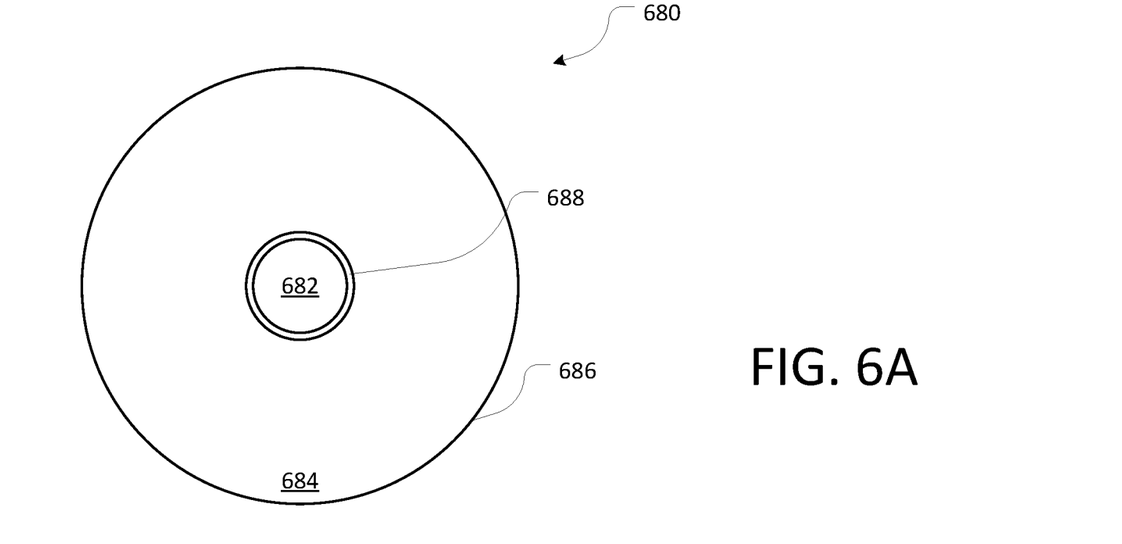
FIGS. 6A and 6B are cross-sectional views of an example configuration of an integrated bus bar and coolant conduit.
Figure 6B:
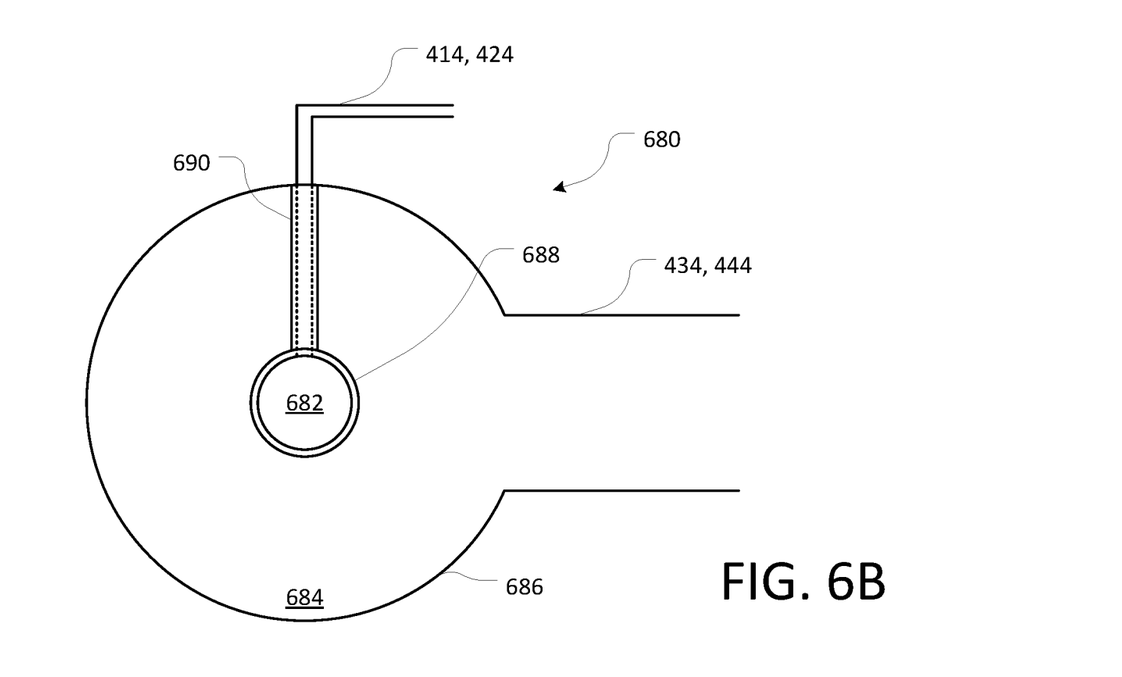
Figure 7:
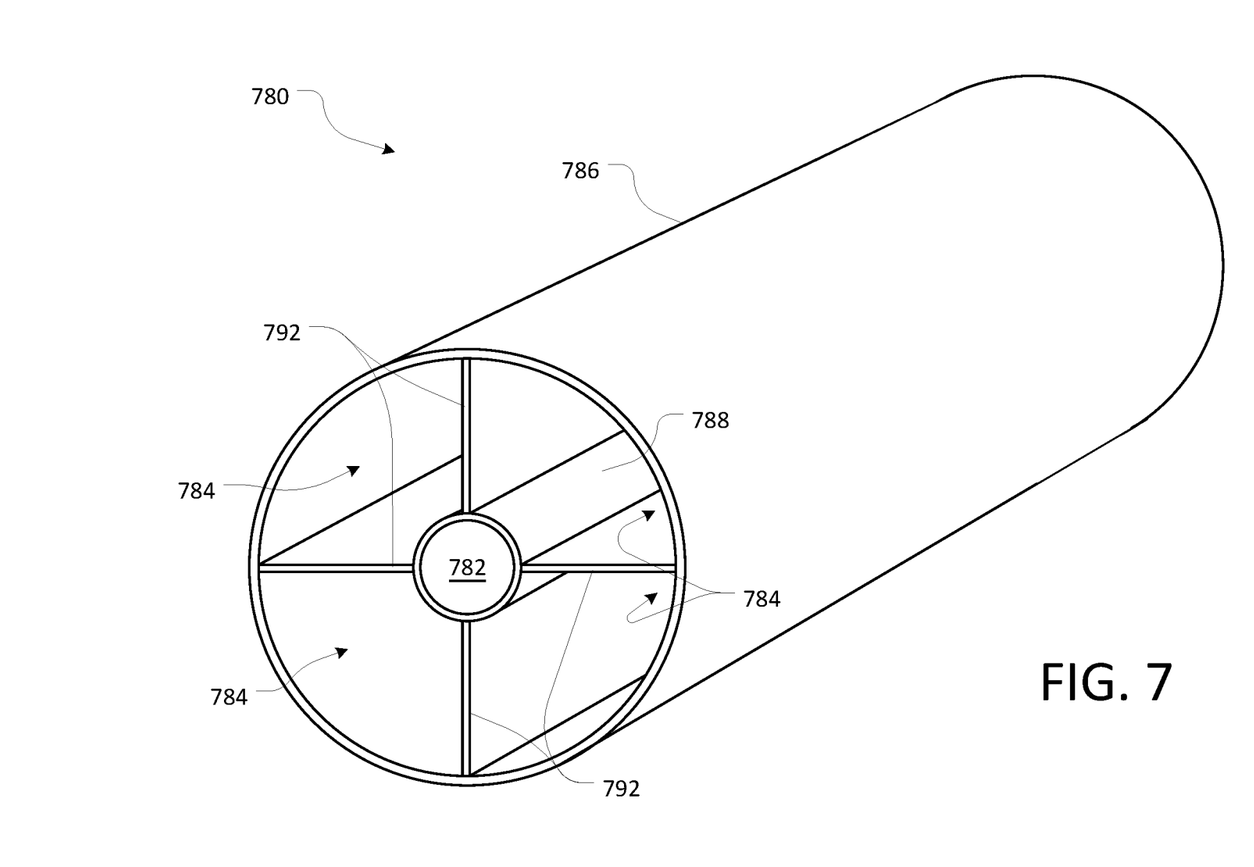
FIG. 7 is a perspective view of an example section of an integrated bus bar and coolant conduit.

With reference to FIGS. 5A-7, various structural features of integrated coolant flow path and electrical current carrier configurations will now be described. FIGS. 5A and 5B depict an example embodiment in which a coolant flow path is disposed within an electrical current carrier. FIGS. 6A-7 depict example embodiments in which an electrical current carrier is disposed within a coolant flow path. Each of the embodiments depicted in FIGS. 5A-7 may be, for example, any of the integrated structures depicted in FIGS. 4B and 4C, such as the integrated bus bar and coolant manifolds 460, 470. As will be described in greater detail, the embodiments depicted in FIGS. 5A-7 are configured to carry electrical current and coolant in a coaxial configuration.

FIGS. 5A and 5B are cross sectional views of an example integrated coolant flow path and electrical current carrier 580. As shown in FIG. 5A, the integrated coolant flow path and electrical current carrier 580 includes a conductive layer 582 surrounding a coolant flow path 584. The conductive layer 582 can be a conduit made from conductive material, for example, with the coolant flow path 584 formed by a lumen of the conduit. The conductive layer 582 may be the outermost layer of the integrated coolant flow path and electrical current carrier 580, or the conductive layer 582 may further be surrounded by an exterior covering 586. The conductive layer 582 may include any suitable electrically conductive material, for example, copper, brass, aluminum, or other metals. The exterior covering 586 may be, for example, any of various electrically and/or thermally insulating materials, such as a plastic, foam, rubberized material, or the like.

In addition, an interior covering 588 may optionally be disposed between the conductive layer 582 and the coolant flow path 584 in order to insulate coolant fluid flowing through the coolant flow path 584 from current flowing through the conductive layer 582. The interior covering 588 may include materials such as a plastic, foam, rubberized material, or other non-conductive coatings. It may be desirable to use a thermally conductive interior covering 588 to facilitate cooling of the conductive layer 582 by coolant within the coolant flow path 584. However, a thermally insulating interior covering 588 may still provide a desirable rate of heat exchange between the coolant and the conductive layer 582. In some embodiments (e.g., if a liquid dielectric will be used as the coolant), the interior covering 588 may be omitted, and the coolant can flow in direct contact with the conductive layer 582.

FIG. 5B depicts a section of the integrated coolant flow path and electrical current carrier 580 including peripheral or branching electrical and coolant connections. For example, the peripheral connections depicted in FIG. 5B may provide connections between the integrated coolant flow path 584 coolant conduits 434, 444, so labeled as to indicate that either conduit 434 or 444 can be implemented with the structure depicted in FIG. 5B, and between the electrical current carrier 580 and the electrical connectors 414, 424, so labeled as to indicate that either electrical connector 414 or 424 can be implemented with the structure depicted in FIG. 5B, described above with reference to FIG. 4B.

An electrical connector 414, 424 is in electrical communication with the conductive layer 582. The electrical connector 414, 424 extends through an opening in the exterior covering 586 (when covering 586 is used). In various embodiments, the electrical connector 414, 424 may be formed integrally with at least a portion of the conductive layer 582, and/or may be a discrete conductive structure (e.g., a wire or other electrical connector) connected to the conductive layer 582 by soldering, welding, mechanical coupling such as by rivets or bolts, or other conductive coupling method. Accordingly, the connection to the electrical connector 414, 424 can allow for intermediate electrical connections to the integrated coolant flow path and electrical current carrier 580 along its path.

Similarly, a coolant conduit 434, 444 is in fluid communication with the coolant flow path 584 through an opening in the conductive layer 582. The opening in the conductive layer 582 may be created when the conductive layer 582 is formed, or may be created later, such as by machining, drilling, or other process. The coolant conduit 434, 444 may further pass through openings in the interior covering 588 and/or exterior covering 586, if those layers are present. Accordingly, the connection to the coolant conduit 434, 444 can allow intermediate liquid cooling connections to the integrated coolant flow path and electrical current carrier 580 along its path (e.g., to battery modules 405 in FIGS. 4A-4C).

FIGS. 6A and 6B are cross sectional views of a further embodiment of an integrated coolant flow path and electrical current carrier 680. As shown in FIG. 6A, the integrated coolant flow path and electrical current carrier 680 includes a conductor 682 disposed within a coolant flow path 684. The coolant flow path 684 may be contained by an exterior wall 686, which may also form the outer boundary of the integrated coolant flow path and electrical current carrier 680. The exterior wall 686 may comprise any of various rigid, semi-rigid, or flexible materials, for example, a plastic or other polymeric material. The conductor 682 may include any suitable electrically conductive material, for example, copper, brass, aluminum, or other metals.

In addition, an interior covering 688 may be disposed between the conductor 682 and the coolant flow path 684. The interior covering 688 can be a non-conductive material to provide electrical insulation between the conductor 682 and the coolant in some implementations. In some implementations, the interior covering 688 may be a rigid or semi-rigid portion of a support structure configured to keep the conductor 682 disposed within a central portion of the integrated coolant flow path and electrical current carrier 680. In some embodiments (e.g., if a liquid dielectric will be used as the coolant), the interior covering 688 may be omitted. The interior covering 688 may include materials such as a plastic, foam, rubberized material, or other coating. It may be desirable to use a thermally conductive interior covering 688 to facilitate cooling of the conductor 682 by coolant within the coolant flow path 684. However, a thermally insulating interior covering 688 may still provide a desirable rate of heat exchange between the coolant and the conductive layer 682.

FIG. 6B depicts a section of the integrated coolant flow path and electrical current carrier 680 including peripheral or branching electrical and coolant connections. For example, the peripheral connections depicted in FIG. 6B may provide connections between the integrated coolant flow path coolant conduits 434, 444, so labeled as to indicate that either conduit 434 or 444 can be implemented with the structure depicted in FIG. 6B, and between the electrical current carrier 680 and the electrical connectors 414, 424 so labeled as to indicate that either electrical connector 414 or 424 can be implemented with the structure depicted in FIG. 6B, described above with reference to FIG. 4B.

An electrical connector 414, 424 is in electrical communication with the conductor 682. The electrical connector 414, 424 extends through an opening in the exterior wall 686. If an interior covering 688 is present, the electrical connector 414, 424 may extend through an opening in the interior covering 688 to make contact with the conductor 682. In various embodiments, the electrical connector 414, 424 may be formed integrally with at least a portion of the conductor 682, and/or may be a discrete conductive structure (e.g., a wire or other electrical connector) connected to the conductor 682 by soldering, welding, mechanical coupling such as by rivets or bolts, or other conductive coupling method. In some embodiments, an electrical connector covering 690 may surround the portion of the electrical connector 414, 424 within the coolant flow path 684. For example, the electrical connector covering 690 may comprise the same material as, and may be contiguous with, the interior covering 688. Accordingly, the connection to the electrical connector 414, 424 can allow for intermediate electrical connections to the integrated coolant flow path and electrical current carrier 680 along its path.

Similarly, a coolant conduit 434, 444 is in fluid communication with the coolant flow path 684 through an opening in the exterior wall 686. The opening in the exterior wall 686 may be created when the exterior wall 686 is formed, or may be created later, such as by machining, drilling, or other process. Accordingly, the connection to the coolant conduit 434, 444 can allow intermediate liquid cooling connections to the integrated coolant flow path and electrical current carrier 680 along its path (e.g., to battery modules 405 in FIGS. 4A-4C).

FIG. 7 is a perspective view of a section of an integrated coolant flow path and electrical current carrier 780 including a centrally located conductor 782 and an interior support structure 792. Similar to the integrated coolant flow path and electrical current carrier 680 of FIGS. 6A and 6B, the integrated coolant flow path and electrical current carrier 780 has a conductor 782 surrounded by coolant flow paths 784. The conductor 782 is disposed within an interior covering 788. The interior covering 788 is coupled to the interior support structure 792, which is in contact with the exterior wall 786, keeping the conductor 782 stationary within a central portion of the integrated coolant flow path and electrical current carrier 780. The interior support structure 792 may include, for example, one or more walls extending longitudinally along some or all of the length of the conductor 782.

In some embodiments, the exterior wall 786, interior covering 788, and support structure 792 may comprise the same material, and may be integrally formed. In one example, the exterior wall 786, interior covering 788, and support structure 792 comprise a plastic material suitable for forming by extrusion. In this example, plastic may be extruded into a continuous profile comprising the exterior wall 786, interior covering 788, and support structure as an integral unit, and the conductor 782 may be separately formed and inserted within the interior covering 788 after extrusion. In some embodiments, the interior covering 788 may comprise a portion of the support structure 792.

Additional details and embodiments relating to the use of liquid cooled batteries in electric vehicles are described in U.S. application Ser. No. 14/841,617, titled "Vehicle Energy-Storage System" and filed on Aug. 31, 2015, which is incorporated by reference herein in its entirety.

The foregoing description details certain embodiments of the systems, devices, and methods disclosed herein. It will be appreciated, however, that no matter how detailed the foregoing appears in text, the devices and methods can be practiced in many ways. As is also stated above, it should be noted that the use of particular terminology when describing certain features or aspects of the invention should not be taken to imply that the terminology is being re-defined herein to be restricted to including any specific characteristics of the features or aspects of the technology with which that terminology is associated. The scope of the disclosure should therefore be construed in accordance with the appended claims and any equivalents thereof.

With respect to the use of any plural and/or singular terms herein, those having skill in the art can translate from the plural to the singular and/or from the singular to the plural as is appropriate to the context and/or application. The various singular/plural permutations may be expressly set forth herein for sake of clarity. Unless otherwise explicitly stated, articles such as "a" or "an" should generally be interpreted to include one or more described items. Accordingly, phrases such as "a device configured to" are intended to include one or more recited devices.

It is noted that the examples may be described as a process. Although the operations may be described as a sequential process, many of the operations can be performed in parallel, or concurrently, and the process can be repeated. In addition, the order of the operations may be rearranged. A process is terminated when its operations are completed. A process may correspond to a method, a function, a procedure, a subroutine, a subprogram, etc.

The previous description of the disclosed implementations is provided to enable any person skilled in the art to make or use the present disclosed process and system. Various modifications to these implementations will be readily apparent to those skilled in the art, and the generic principles defined herein may be applied to other implementations without departing from the spirit or scope of the disclosed process and system. Thus, the present disclosed process and system is not intended to be limited to the implementations shown herein but is to be accorded the widest scope consistent with the principles and novel features disclosed herein.

What is claimed is:

1. An electric vehicle battery system comprising:
   at least one battery module comprising one or more fluid cooled electrochemical cells and a terminal;
   a bus bar electrically connected to the terminal, the bus bar configured to electrically connect the at least one terminal to an external terminal of the battery system; and
   a coolant manifold in fluid communication with the at least one battery module and a cooling system of the electric vehicle,
   wherein at least a portion of the bus bar is disposed within the coolant manifold and has a longitudinal axis disposed within the coolant manifold, and the terminal of the battery module is electrically connected to the bus bar by a connection disposed along the portion of the bus bar disposed within the coolant manifold, the connection comprising a transverse electrical connector extending perpendicularly from the bus bar through the coolant manifold.

2. The electric vehicle battery system of claim 1, wherein at least a portion of the bus bar comprises a conductive layer surrounding a coolant flow path, the coolant flow path comprising at least a portion of the coolant manifold.

3. The electric vehicle battery system of claim 2, wherein the bus bar further comprises an exterior covering surrounding the conductive layer, the exterior covering comprising an electrically insulating material.

4. The electric vehicle battery system of claim 1, wherein at least a portion of the coolant manifold comprises an exterior wall surrounding both a coolant flow path and a conductor, the conductor comprising at least a portion of the bus bar.

5. The electric vehicle battery system of claim 4, wherein the coolant manifold comprises an interior support structure configured to retain at least a portion of the bus bar therein.

6. The electric vehicle battery system of claim 5, wherein the interior support structure and an exterior wall of the coolant manifold comprise an integrally formed extruded plastic profile.

7. The electric vehicle battery system of claim 1, wherein at least a portion of the bus bar is coaxial with at least a portion of the coolant manifold.

8. The electric vehicle battery system of claim 1, wherein the at least one battery module is in fluid communication with the coolant manifold through a coolant connection disposed along a portion of the coolant manifold disposed about the longitudinal axis of the bus bar.

9. The electric vehicle battery system of claim 8, wherein the portion of the coolant manifold is disposed within the bus bar, and wherein the coolant connection comprises an opening in the bus bar.

10. The electric vehicle battery system of claim 1, wherein the electric vehicle battery system comprises:
    a plurality of battery modules, each of the plurality of battery modules comprising a positive terminal and a negative terminal;
    a positive bus bar electrically connected to the positive terminals of the plurality of battery modules;
    a first coolant manifold coaxial with the positive bus bar along at least a portion of its length;
    a negative bus bar electrically connected to the negative terminals of the plurality of battery modules; and
    a second coolant manifold coaxial with the negative bus bar along at least a portion of its length.

11. The electric vehicle battery system of claim 10, wherein each of the plurality of battery modules comprises an individually controllable battery string.

12. An integrated bus bar and coolant manifold comprising:
    an exterior wall surrounding a coolant flow path along a longitudinal axis;
    a conductive bus bar disposed within a central portion of the coolant flow path, the bus bar extending along the longitudinal axis; and
    a support structure coupled to the exterior wall and at least partially surrounding the bus bar, the support structure configured to retain the bus bar in the central portion of the coolant flow path.

13. The integrated bus bar and coolant manifold of claim 12, wherein the exterior wall and the support structure are integrally formed.

14. The integrated bus bar and coolant manifold of claim 12, wherein the bus bar and the coolant flow path are coaxial.

15. The integrated bus bar and coolant manifold of claim 12, further comprising at least one peripheral electrical connection, the peripheral electrical connection comprising:
    a transverse electrical connector extending from the bus bar along an axis perpendicular to the longitudinal axis, the transverse electrical connector configured to electrically connect bus bar and an electric vehicle battery module; and
    an electrical connector covering at least partially surrounding the transverse electrical connector within the coolant flow path.

* * * * *